United States Patent
Agarwal et al.

(10) Patent No.: US 11,087,359 B1
(45) Date of Patent: Aug. 10, 2021

(54) IMMERSIVE CONTENT ITEMS

(71) Applicant: Google LLC, Mountain View, CA (US)

(72) Inventors: Ayush Agarwal, Palo Alto, CA (US);
Sheng Chen, Milpitas, CA (US); Jason W. Blythe, San Francisco, CA (US);
Sundeep Jain, Los Altos, CA (US);
Awaneesh Verma, San Francisco, CA (US); Yunkai Zhou, Los Altos, CA (US)

(73) Assignee: Google LLC, Mountain View, CA (US)

( * ) Notice: Subject to any disclaimer, the term of this patent is extended or adjusted under 35 U.S.C. 154(b) by 792 days.

(21) Appl. No.: 15/077,010

(22) Filed: Mar. 22, 2016

Related U.S. Application Data

(60) Provisional application No. 62/137,179, filed on Mar. 23, 2015.

(51) Int. Cl.
*G06Q 30/02* (2012.01)
*G06F 16/58* (2019.01)
*G06F 16/951* (2019.01)

(52) U.S. Cl.
CPC ......... *G06Q 30/0256* (2013.01); *G06F 16/58* (2019.01); *G06F 16/951* (2019.01)

(58) Field of Classification Search
CPC .............. G06Q 30/02; G06Q 30/0256; G06F 17/30265; G06F 17/30864
See application file for complete search history.

(56) References Cited

U.S. PATENT DOCUMENTS

| | | | | |
|---|---|---|---|---|
| 2003/0204449 A1* | 10/2003 | Kotas | ................... | G06Q 10/087 707/781 |
| 2008/0307343 A1* | 12/2008 | Robert | .................. | G06F 3/0482 715/765 |
| 2009/0313100 A1* | 12/2009 | Ingleshwar | ............ | G06Q 30/02 705/14.25 |
| 2015/0293977 A1* | 10/2015 | Perl | .................... | G06Q 30/0256 705/14.54 |
| 2016/0078506 A1* | 3/2016 | Sesti | .................. | G06Q 30/0643 705/27.2 |

OTHER PUBLICATIONS

Plant et al., "Navigation and Browsing of Image Databases" (published in 2009 International Conference of Soft Computing and Pattern Recognition, pp. 750-755, Dec. 2009) (Year: 2009).*

* cited by examiner

*Primary Examiner* — Abhishek Vyas
*Assistant Examiner* — Patrick Kim
(74) *Attorney, Agent, or Firm* — Fish & Richardson P.C.

(57) ABSTRACT

Methods, systems, and apparatus, including computer programs encoded on a computer storage medium, for distributing content items. In one aspect, a method includes presenting an immersive content item at a client device. The immersive content item includes a first presentation interface that includes a scrollable image portion that presents an image having a first interaction point and a preview graphic indicating the availability of other images for presentation. The immersive content item also includes a second presentation interface that is initiated upon interaction with the first interaction point. The second presentation interface includes a scrollable image portion that presents an image from a plurality of images and an image sequencing indicator.

15 Claims, 11 Drawing Sheets

IMMERSIVE CONTENT ITEMS

CROSS-REFERENCE TO RELATED APPLICATIONS

This application claims the benefit under 35 U.S.C. § 119(e) of U.S. Patent Application No. 62/137,179, entitled "Immersive Content Items," filed Mar. 23, 2015. The disclosure of the foregoing application is incorporated herein by reference in its entirety for all purposes.

BACKGROUND

This specification relates to data processing and content distribution.

The Internet facilitates the exchange of information and transactions between users across the globe. This exchange of information enables content sponsors to provide sponsored content to a variety of users. A content sponsor can control the distribution of their content items (e.g., promotions, advertisements, audio files, video files, or other content items) based on a set of distribution parameters that specify under what conditions a content item is eligible to be distributed. When a presentation opportunity meeting the conditions is available, the content item provided by a content sponsor is deemed eligible to be provided for presentation.

SUMMARY

In general, one innovative aspect of the subject matter described in this specification can be embodied in methods that include the actions of receiving a query; processing the query to determine an additional content item to provide along with search results that are responsive to the query, wherein processing includes: identifying a product or service associated with the query; locating an immersive content item from an inventory of available content items that is relevant to the product or service, wherein the immersive content item includes a first presentation interface that includes a title, an image with an first interaction point, a preview graphic indicating the availability of other images for presentation, a tag line, and a plurality of additional interaction points, and wherein the immersive content item includes a second presentation interface that is initiated upon interaction with the first interaction point that includes a scrollable image portion including a first image of a plurality of images and an image sequencing indicator, and a repositioned title, a tag line and one or more of the additional interaction points; and providing the immersive content item for presentation along with search results responsive to the received query. Other embodiments of this aspect include corresponding systems, apparatus, and computer programs, configured to perform the actions of the methods, encoded on computer storage devices.

These and other embodiments can each optionally include one or more of the following features. At least one of the additional interaction points can be configured, upon interaction, to generate a new search query related to the received search query and submit the new search query to a search engine so as to enable new search results to be presented.

The new search query can be for a supplier or source of the product or service and the search results can include supplier, dealership or other entity for enabling purchasing the product or service.

The scrollable image portion can include an initial image of the plural images for viewing in the scrollable image portion. The plural images can be in a sequence. The scrollable image portion can include a first control for transitioning between the plural images in accordance with the sequence.

The scrollable image portion can include a last image in the plural images. The last image can include an interaction point and descriptive text for redirecting a user to a web resource with additional information relating to the product or service.

The second presentation interface can include a control for transitioning back to the first presentation interface. When the control is activated, the first presentation interface can be re-presented with an image that was a last image presented to a respective user in the second presentation interface.

Providing the immersive content item can include providing instructions for loading the first and second presentation interfaces including images for the plurality of images Providing the immersive content item can include providing instructions for loading the first presentation interface at a time when the immersive content item is provided. Upon receipt of an interaction with the first interaction point, the method can include providing instructions for rendering the second presentation interface including providing at least a first image of the plurality of images.

The method can include providing the plurality of images along with the instructions for rendering the second presentation interface.

Another innovative aspect of the subject matter described in this specification can be embodied in methods that include the actions of generating at a client device a query and submitting the query to a search service; receiving an immersive advertisement responsive to the query and search results, where the immersive advertisement is sponsored and where the search results are organic; presenting on a display associated with the client device the immersive advertisement, including presenting a first presentation aspect that includes an image portion that includes a first image and an image hint for a second image in a sequence of images that are associated with the immersive advertisement, where the immersive advertisement includes a first control for transitioning to presentation of a different image for presentation in the image portion from the sequence and a different portion of an image as the image hint responsive to user interaction with the first control; receiving an indication of user interaction with the first control; and transitioning including presenting a next image in the sequence in the image portion and an image hint for an image that follows the next image in the sequence. Other embodiments of this aspect include corresponding systems, apparatus, and computer programs, configured to perform the actions of the methods, encoded on computer storage devices.

These and other embodiments can each optionally include one or more of the following features. Methods can include providing a second control in the first presentation aspect for transitioning to a second different presentation aspect, the second different presentation aspect including an image portion for presenting a then current image in the sequence and a sequence indicator for presenting an indication for where in the sequence the current image lies.

Methods can include receiving user interaction with the second control and transitioning display of the immersive advertisement to the second presentation aspect.

Methods can include receiving a user interaction for transitioning back to the first presentation aspect, determining a then current image that is included in the image portion of the second different presentation aspect, and presenting the then current image as the first image in the first presentation aspect.

Particular embodiments of the subject matter described in this specification can be implemented so as to realize none, one, or more of the following advantages. The subject matter of this document can facilitate access to different types of content through a single immersive content item, while providing more information than is capable of being simultaneously presented in a display space occupied by the immersive content item. The subject matter of this document enables a mobile device or tablet device to better utilize the limited display space that is available for presentation of content, thereby improving the ability of the mobile device or tablet device to present more content than is simultaneously presentable on the limited display space. The subject matter of this document enables dynamic creation of immersive content items that can change a presentation environment presented at a mobile device or tablet device based, at least in part, on location information provided by the mobile device or tablet device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes apparatus, systems, methods, and computer readable medium related to distribution of immersive content items. An immersive content item is a content item that includes multiple presentation interfaces and various interactive functionality (e.g., facilitating requests for more multimedia content, requests for a top level web page of an advertiser website, requests for a specified lower level page of the advertiser website, and/or a requery for additional information related to a product being advertised by the immersive content item). As discussed in more detail below, the immersive content item can include multimedia items (e.g., images, video, audio or combinations thereof), a title, a tagline, and a scrollable multimedia portion in which at least some of the multimedia items can be presented.

User interaction with a given portion (e.g., a multimedia item) of the immersive content item can transition the immersive content item from a first presentation interface to a second presentation interface. The transition from the first presentation interface to the second presentation interface can include a reformatting/repositioning of information presented in the first presentation interface (e.g., a title and navigation elements) and presentation of additional information (e.g., factual information about a service or product) that was not presented in the first presentation interface. Additionally, the size of the second presentation interface can be larger than the first presentation interface and occlude a portion or all of the search results (or other content) that was presented with the immersive content item in the first presentation interface. The transition from the first presentation interface to the second presentation interface can also be completed without navigating away from the search results page or resource with which the immersive content item was originally presented.

Once the immersive content item is presented in the second presentation interface, the immersive content item can be transitioned back to the first presentation interface through user interaction with a control. When the immersive content item is transitioned back to the first presentation interface, a then current image in a sequence of images that is currently displayed in the second presentation interface can be included in an image portion of the first presentation interface.

Figure 1:
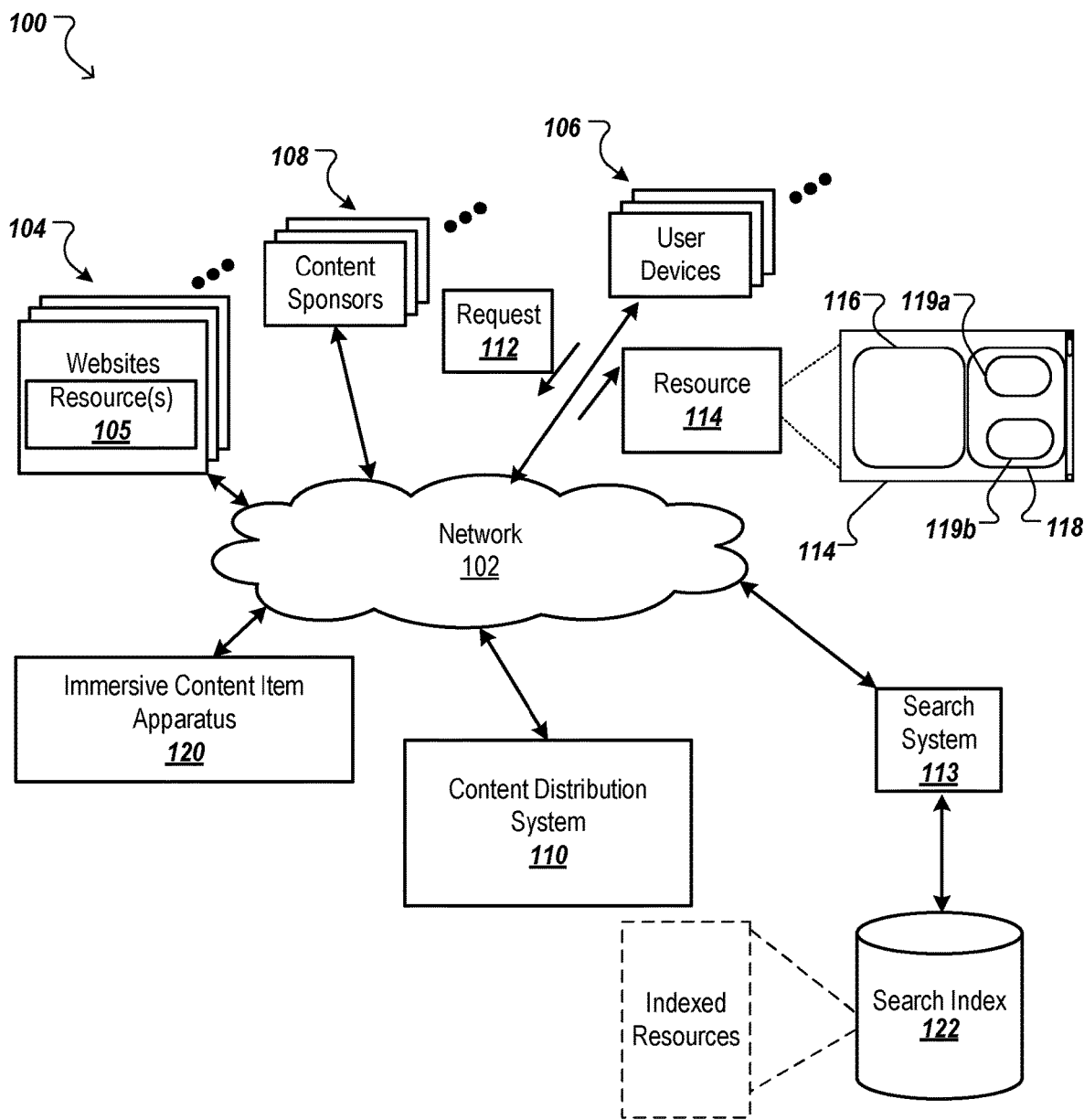
FIG. 1 is a block diagram of an example environment in which content is distributed to user devices.

FIG. 1 is a block diagram of an example environment 100 in which content is distributed to user devices 106. The example environment 100 includes a network 102, such as a local area network (LAN), a wide area network (WAN), the Internet, or a combination thereof. The network 102 connects websites 104, user devices 106, content sponsors 108, and a content distribution system 110. The example environment 100 may include many different websites 104, user devices 106, and content sponsors 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts). Units of content that are presented in (or with) resources are referred to as content items, and an individual content item can be stored in a single file or set of files independent of the resource.

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, a web page from a social network, or another resource 105. The data representing the requested resource 114 can include data that cause presentation of resource content 116 at the user device 106. The data representing the requested resource 114 can also include data specifying a content item slot 118.

A content item slot is a portion of the resource (e.g., a portion of a web page or portion of search results) or a portion of a user display (e.g., a presentation location of another window or in a slot of a web page) in which one or more content items, such as advertisements, can be presented. A content items slot 118 can also be referred to as an advertisement slot, but any type of content (e.g., content items other than advertisements) can be presented in the content item slot 118.

A single content item slot 118 may be configured to include one or more presentation positions 119a and 119b. Alternatively or additionally, each different content item slot 118 can be considered a separate presentation position, and a resource can include multiple different content item slots. Each presentation position can represent a portion of the content item slot 118 at which a content item can be presented. In some implementations, the number of presentation positions and/or the size of the presentation positions for a particular content item slot 118 may be determined, for example, based on the number, type, and/or value of content items that are available for presentation in the content item slot.

The content item slot 118 can be located at a top of or along a side of the display (as shown), and presented with other content (e.g., such as search results or publisher content). The content item slot 118 can also be presented at other locations. For example, the content item slot 118 can be located at a banner portion of the display (e.g., across a top portion of the display).

To facilitate searching of resources, the environment 100 can include a search system 113 that identifies the resources by crawling and indexing the resources provided by the publishers on the websites 104. Data about the resources can be indexed based on the resource with which the data are associated. The indexed and, optionally, cached copies of the resources are stored in a search index 122. Data that are associated with a resource is data that represents content included in the resource and/or metadata for the resource.

User devices 106 can submit search queries to the search system 113 over the network 102. In response, the search system 113 accesses the search index 122 to identify resources that are relevant to the search query. The search system 113 identifies the resources in the form of search results and returns the search results to the user device in search results page. A search result is data generated by the search system 113 that identifies a resource that is responsive to a particular search query, and includes a link to the resource. An example search result can include a web page title, a snippet of text or a portion of an image extracted from the web page, and the URL of the web page. Like other resources, search results pages can include one or more content item slots 118 in which content items, such as advertisements, can be presented.

When a resource 105 is requested by a user device 106, execution of code associated with a content item slot 118 in the resource initiates a request for one or more content items to populate the slot, which is referred to as a content item request. The content item request can include characteristics of the slots that are defined for the requested resource 114. For example, a reference (e.g., URL) to the requested resource 114 for which the content item slot 118 is defined, a size of the content item slot, a maximum number of presentation positions (or content items) that can be included in the content item slot 118, and/or media types that are eligible for presentation in the content item slot 118 can be provided to the content distribution system 110. Similarly, keywords associated with a requested resource ("resource keywords") or entities that are referenced by the resource can also be provided to the content distribution system 110 to facilitate identification of content items that are relevant to the requested resource 114. Content item requests can also include other information, such as information that the user has provided, geographic information indicating a state or region from which the request was submitted, or other information that provides context for the environment in which the content item will be displayed (e.g., a type of device at which the content item will be displayed, such as a mobile device or tablet device).

The content items that are provided in response to a content item request (or another request) are identified based, in part, on distribution parameters associated with the content items. Distribution parameters are a set of criteria upon which distribution of content items are conditioned. In some implementations, the distribution parameters for a particular content item can include distribution keywords that must be matched (e.g., by resource keywords or search queries) in order for the content item to be eligible for presentation. The distribution parameters can also require that the content item request include information specifying a particular geographic region (e.g., country or state) and/or information specifying that the content item request originated at a particular type of user device. The distribution parameters can also specify a bid and/or budget for distributing the particular content item. Bids can be used to select a set of content items for presentation with a resource and/or to determine in which presentation position the content item(s) will be presented.

The experience provided by most online content items (e.g., advertisements) is the ability for a user to interact with the content item and, in response to the interaction, navigate to a linked website. This single interactive functionality enables a user to visit a website that is linked to by the content item and browse the site for additional content. However, content items that provide a more immersive experience can be created and provided to users. These immersive content items can include various functionality that enable a user to customize the experience provided by the content item, e.g., though interaction with various portions of the immersive content item. For example, as discussed in more detail below, an immersive content item can include the capability of presenting to the user various images, videos, or other multimedia content related to a given product or service. Immersive content items can also enable the user to obtain various types of information related to the given product or service. Some of the other types of information include pricing information and/or locations where the product can be purchased. The immersive content items can also include functionality that enables the user to build a custom product by selecting options, and being provided information (e.g., price and availability) about the custom product.

To facilitate creation and distribution of immersive content items, the environment 100 includes an immersive content item apparatus ("ICIA") 120. In some implementations, the ICIA 120 operates in conjunction with the content distribution system 110 to distribute immersive content items to users. In some implementations, the ICIA 120 is part of the content distribution system 110. As discussed in detail below, the immersive content items can be distributed for presentation with search results responsive to a given search query, and the immersive content items distributed can be related to a product or service that is referred to in the search query.

Figure 2:
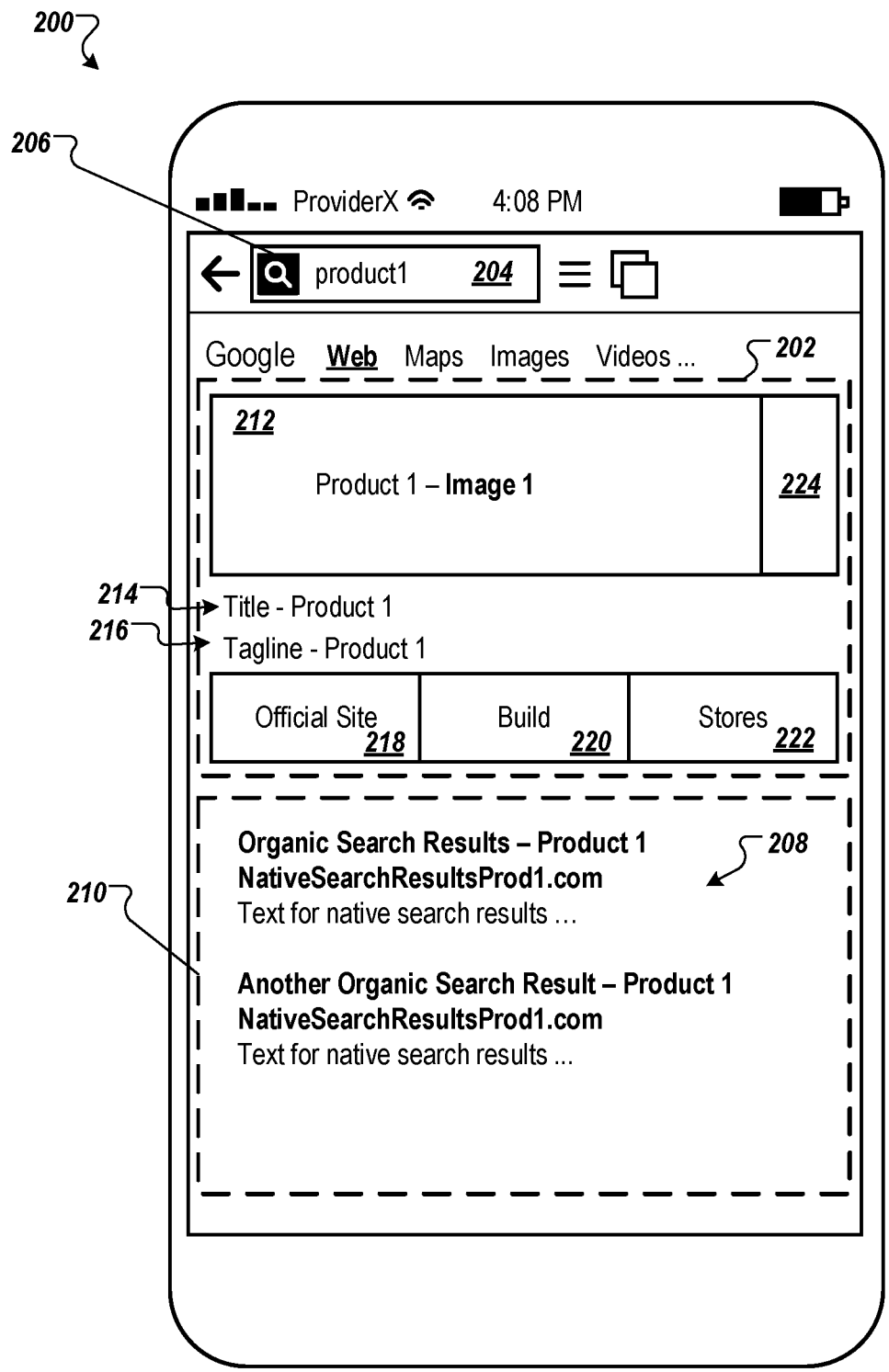
FIG. 2 is an illustration of an example mobile communications device presenting an immersive content item in an example search results environment.

FIG. 2 is an illustration of an example mobile communications device ("mobile device") 200 presenting an immersive content item 202 in an example search results page. The mobile device 200 is capable of communicating over a mobile network (e.g., a cellular network operated by ProviderX), a WiFi network, or another communications interface.

The mobile device 200 includes an application that facilitates online searches. For example, the mobile device 200 can include a browser that enables a user to access a web page of an online search provider. Additionally or alternatively, the mobile device 200 can include a native search application that is stored on the mobile device 200 and facilitates online searches through the native application (e.g., without opening a browser application). The description that follows will refer to presentation of information in a native search application (referred to as the "search application") running on a mobile device, but the description is also applicable to online search environments such as those presented in a browser (e.g., through interaction with a search provider website) or other applications and in desktop or tablet devices.

As illustrated by FIG. 2, the search application includes a query entry field 204 in which a user can enter a search query. For example, as shown in FIG. 2, the user has entered the search query "product1" into the query entry field 204. Upon user interaction with a submission element 206, the search application causes the user device 200 to submit the search query "product1" to a search service. In response to receiving the search query, the search service (e.g., an online search server) will identify resources that are related to the received search query, and provide "organic search results" 208 for presentation at the user device 200. In some implementations, the user device 200 presents the organic search results 208 in an organic search results portion 210 of the display.

Submission of the search query can also trigger a request for additional content (i.e., content that is not identified by the search service or search server that identifies the organic search results). In some implementations, the submitted query and/or other information associated with the query (e.g., geographic location of the user device that submitted the query, user profile information associated with the user that submitted the query, and/or historical interaction information such as previously submitted queries) is included in a request for advertisements or other content items to be presented in a same display with the organic search results.

For example, upon receipt of the search query, the search service (or another data processing apparatus) can use the query and any information associated with the query to generate a request for one or more advertisements that will be presented with the organic search results. In turn, the search service can transmit this request to the ICIA 120.

The ICIA 120 receives the request, which includes the query, and processes the query (and associated information) to identify an additional content item that will be provided to the user device 200 for presentation with the organic search results. The processing of the query can include, for example, identifying text and/or images that are submitted as part of the search query. The identified query text and/or images can be used to identify a product or service that is associated with the query. For example, using the search query "product1" the ICIA 120 can identify a product that is being referred to in the search query.

The identification of the product being referred to by a given search query can be determined, for example, using term matching, contextual analysis techniques, similarity measures between the search query and terms or phrases that are used to refer to the products, and/or other techniques for matching a search query to a product. In the present example, assume that there is a given product named product1, which is considered referred to by the search query "product1." Note that the search query need not refer to a particular unique product, but can refer to a class or category of products.

Once the ICIA 120 has determined that the search query relates to a given product (e.g., product1), the ICIA 120 can continue the processing by locating a content item that is related to the given product. In some implementations, the identification can be based on distribution keywords that are matched by a reference to the given product (e.g., product1) as discussed above with reference to FIG. 1.

In some implementations, the ICIA 120 identifies an immersive content item 202 that is related to the given product (e.g., product1). An immersive content item provides multiple different presentation interfaces to a user, and also includes multiple different interaction areas that each initiate a different interactive functionality. For example, the immersive content item 202 provides an initial presentation interface in which the user is presented with a scrollable image portion ("image portion") 212, a title 214, a tagline 216, and three navigational elements 218, 220, and 222, which include (or define) interaction points. Each of these different portions of the immersive content item 202 can include code that initiates various interactive functionality (e.g., interaction points), as described below.

The image portion 212 is described with reference to presentation of images associated with a given product. However, the image portion 212 can be a portion of the immersive content item 200 that provides access to any multimedia content (e.g., sounds, videos, or other multimedia content). As such, the image portion 212 can also be referred to as a multimedia portion of the immersive content item 202. The description that follows with reference to the image portion 212 is also applicable to implementations in which other types of multimedia content are presented in a multimedia portion of the immersive content item 202. In some implementations, the image portion includes a first image portion for presentation of a first image in a sequence of images that are associated with the located product or service and an image hint portion. The image hint portion can be of the form of a portion of a next image in the sequence, so as to suggest to the user that more images are available for viewing in the first interface. The image hint portion is discussed in greater detail below.

The title 214 and the tag line 216 provide information about the product. For example, the title 214 may identify the name (or brand) of the product being advertised in the immersive content item 202, and the tag line 216 may be a marketing slogan associated with the product or information associated with the image being presented in the image portion 212. In some implementations, one or both of the title 214 and a tagline 216 can be linked to a webpage (or another network resource) associated with the product, such that user interaction with the title 214 or tagline 216 can initiate a request for the webpage. For example, each of the title 214 and the tagline 216 can be linked to a top-level page of the advertiser's website (e.g., a home page of the advertiser's website), such that user interaction with the title 214 or tagline 216 will initiate a request for the top-level page of the advertiser's website. The three navigational elements 218, 220, and 222 can each initiate a different interactive functionality, as discussed in more detail below.

The image portion 212 can include an image of the product (or related to the product) and a preview graphic 224 (e.g., the image hint) of a portion of a different image indicating to the user that there are one or more other images available to view within the immersive content item 202. The one or more other images can be, for example, additional images of the product or related to the product that the advertiser has provided for presentation in the immersive content item 202. The portion can be of the form of a small portion (such as occupying 10% of the overall image space) and including only a corresponding portion of the next image in a sequence of images. As will be discussed in more detail below, a user can interact with (e.g., swipe) the image portion 212 (e.g., by dragging their finger from right to left) to view a next available image (e.g., the image identified in the preview graphic 224). Alternatively, the user can use a mouse (or other pointing device) to perform a designated interaction that will scroll through the images.

A user tap (or click) on the image portion 212 can initiate a first interactive functionality in response to user interaction with the image portion 212. For example, a user tap (or click) on the image portion 212 can cause the immersive content item 202 to expand (i.e., increase in height and/or width) within the display area of the mobile device 200 and occlude at least a portion of the organic search results 208, as illustrated by FIG. 3.

Figure 3:
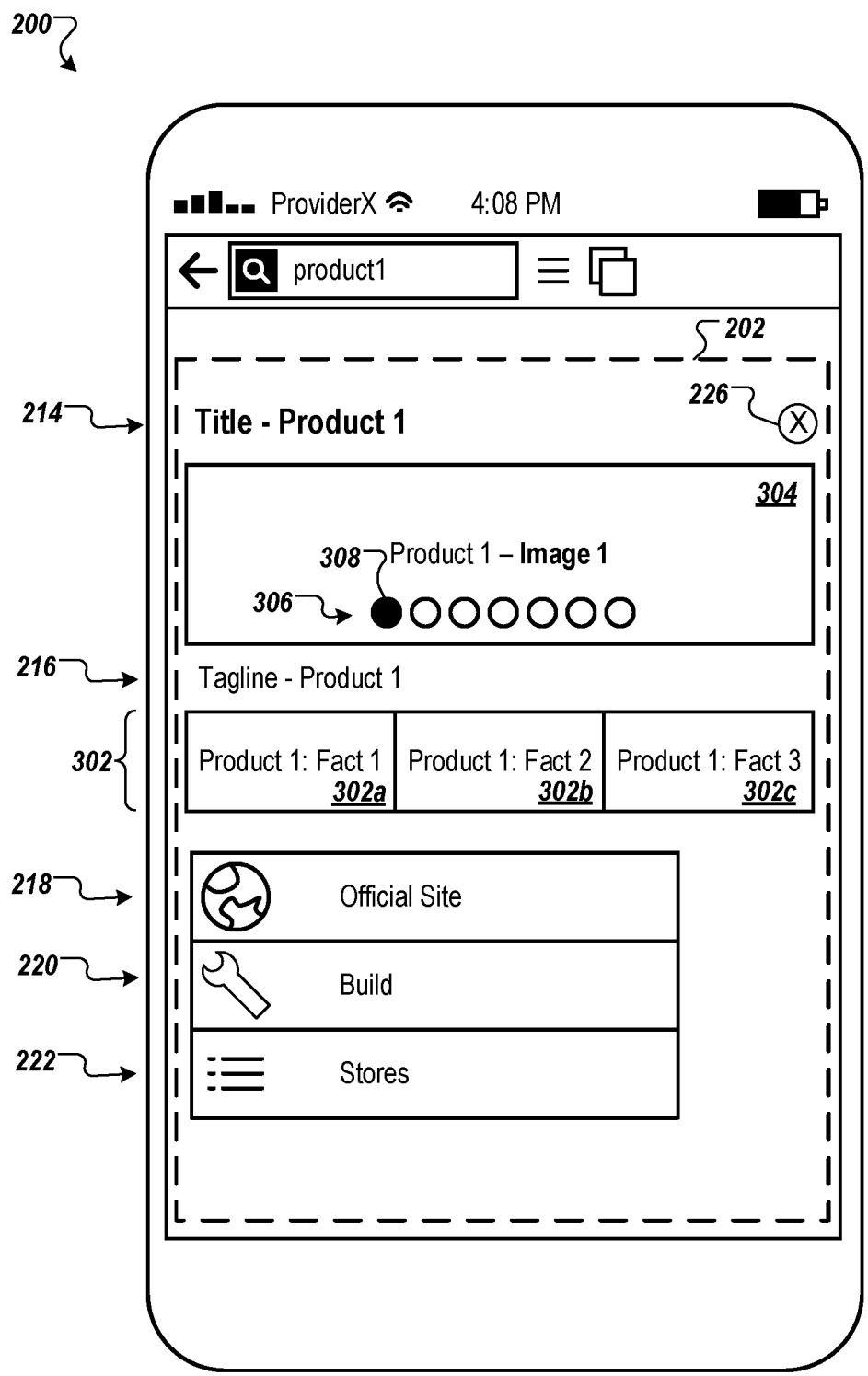
FIG. 3 is an illustration of a second presentation interface that is provided by the immersive content item subsequent to user interaction with the immersive content item.

FIG. 3 is an illustration of a second presentation interface that is provided by the immersive content item 202 subsequent to user interaction with the immersive content item 202. As illustrated by FIG. 3, in the second presentation interface, the immersive content item 202 has expanded to occupy an entire display area of the mobile device 200 and occludes all of the organic search results that were previously presented. In some implementations, the immersive content item 202 expands to fill less than the entire display area of the mobile device 200 (or a tablet device), but may still occlude at least a portion of the organic search results that were presented prior to the user tap (or other designated interaction) with the image portion 212 of the immersive content item. Note that the expansion of the immersive content item 202 does not require the user to navigate away from the organic search results 208, as the organic search results 208 can remain loaded while the second presentation interface is provided by the immersive content item 202. As illustrated by FIG. 3, in the second presentation interface, the immersive content item 202 can include an interface transition element 226 that causes presentation of the second presentation interface to be ended. When presentation of the second presentation interface is ended, the organic search results 208 are again be presented to the user. As discussed in more detail below, user interaction with the second presentation interface can be used to modify the first presentation interface that is presented to the user after ending a second presentation interface.

In the second presentation interface, the immersive content item 202 can be reformatted in various ways (e.g., relative to the formatting of the immersive content item 202 in the first presentation interface). For example, in addition to being resized, the layout of the immersive content item 202 can be reconfigured. As illustrated by FIG. 3, the title 214 can be moved above the image portion 212, while the tag line 216 can remain below the image portion. The three navigational elements 218, 220, and 222 can also be repositioned and/or resized. For example, as shown in FIG. 3, the three navigational elements 218, 220, and 222 have been rearranged in a vertical presentation configuration and expanded horizontally (e.g., relative to the arrangement of the navigational elements 218, 220, and 222 in the first presentation interface).

The three navigational elements 218, 220, and 222 can each initiate a different interactive functionality, and the interactive functionality of each of the navigational elements 218, 220, and 222 can be provided in each of the first presentation interface and the second presentation interface. For example, the navigational element 218 can include a link (or another reference) to a top level page of the advertiser's website (e.g., the advertiser's home page), which enables the user to access the top-level page of the advertiser's website by interacting with the navigational element 218.

The navigational element 220 can include a link to a specific page of the advertiser's website (e.g., a lower-level page of the advertiser's website relative to the top level page), which enables the user to directly request the specific page through interaction with the navigational element 220. In some implementations, the specific page that is linked to by the navigational element 220 can be dynamically selected based on the context in which the immersive content item 202 is being presented.

The context in which the immersive content item 202 is being presented can be determined, for example, based on information associated with the search query that was submitted (e.g., information associated with the search query "product1"). For example, the context can include a time of day and/or day of the week when the immersive content item 202 is being presented. Similarly, the context can be based on a geographic region (e.g., city, state, or nation) from which the search query 204 was submitted. The context can also be based on information associated with the user and/or activities or interactions performed by the user (e.g., previous search queries submitted, webpages viewed, and/or other information requested by/submitted by the user) prior to submission of the search query in response to which the immersive content item 202 was provided.

For purposes of example, assume that the ICIA 120 determines that the immersive content item 202 was provided at 2:30 PM on a Friday, and that the user that submitted the search query 204 has previously searched for various information regarding a given product, including, for example, pricing information and/or a location at which the given product can be purchased. Also assume that the ICIA 120 determines that the search query 204 was submitted from a user device that is located within a specified distance of one or more manufacturers, dealers, or resellers of the given product.

In this example, ICIA 120 may determine that the current context matches a context similar to that associated with previous user sessions during which users ultimately configured and/or purchased the given product. As such, the navigational element 220 that the ICIA 120 selects (and/or creates) for presentation in the immersive content item 202 can include an active link to a specific page that enables the user to configure or customize available options for the given product, obtain pricing for reconfigured or customize version of the given product, and/or purchase the given product. Thus, user interaction with (e.g., a user tap or click on) the navigational element 220 will initiate a request for the specific page, thereby enabling the user to directly navigate from the immersive content item 202 to the specific page (i.e., without requiring the user to first navigate to the top-level page of the advertiser's website or manually entering the URL of the specific page).

The navigational element 222 can initiate a different interactive functionality than the navigational element 220 or the navigational element 218. In some implementations, the navigational element 222 can initiate a requery for additional information about the product being advertised. The requery can be created, for example, based on the search query 204 that was submitted and other information related to the search query 204. In some implementations, the requery includes the search query 204 that was submitted by the user and/or other terms. In some implementations, the requery is a variation of the search query 204.

The other information related to the search query 204 can be determined, for example, based on historical interaction information related to other users that have previously submitted the search query 204 (or a similar search query e.g., a search query related to the same product or class of product). For example, assuming that the search query 204 is related to a specific car model, historical search queries related to the specific car model can be evaluated to identify other search queries that user submitted when searching for information related to the specific car model. Similarly, user interactions with various search results presented in response to historical search queries and/or other activities of the users following submission of the search query (e.g., pages of the advertiser's website that were visited and/or a portion of the users that ultimately purchased the product being advertised) can be evaluated to identify information that was useful to the previous users who were searching for information related to the product being advertised.

In a particular example, if a sufficient number of users have submitted search queries to identify dealers that sell the specific car model, this information can be used by the ICIA 120 to determine that the navigational element 222 of the immersive content item 202 should initiate a search query for dealers of the specific car model. In this example, the ICIA 120 can configure the navigational element 222 to initiate a requery of "product1 dealers" in response to user interaction with the navigational element 222. User interaction with the navigational element 222 will cause a new search query ("product1 dealers") to be submitted to the search service, which will respond with a new set of search results that are relevant to the newly submitted search query. Thus, the navigational element 222 enables the user to search for additional information related to the product associated with their original search query without having to formulate a new search query.

In some implementations, the search query that is associated with the navigational element 222 can vary based on the context in which the immersive content item 202 is presented. The new search query that it selected for a given presentation of the immersive content item 202 can be selected based on historical information related to previous user sessions that had contexts similar to that of the current user session in which the immersive content item 200 to its being presented. For example, the new search query can be selected using historical information associated with users in a similar geographic region as the user that submitted the search query 204. Similarly, the new search query can be selected using historical information associated with users that performed similar search queries and/or research as the user that submitted search query 204. Further, the new search query can be selected using historical information associated with users that have similar interests as the user that performed similar search queries (e.g., users that enjoy car shows).

Selecting the new search query based on the context in which the immersive content item 202 is presented can enable the user to identify information that other similarly situated users found useful. For example, based on historical information the ICIA 120 may determine that similarly situated users (e.g., users in user sessions having similar contexts as the current user session) ultimately found reviews of the given product useful in the research. In this example, the ICIA 120 may choose and/or create a new search query such as "product1 reviews," and associate this new search query with the navigational element 222. In response to user interaction with the navigational element 222, the mobile device 200 will submit the new search query "product1 reviews" to the search service, and obtain organic search results relevant to the new search query.

Additional and/or different interactive functionalities can be associated with navigational elements of the immersive content item 202. For example, the immersive content item 202 can include a navigational element that invokes a phone call in response to user interaction with the navigational elements, thereby causing the mobile device to dial a phone number of the advertiser. In this example, the navigational element enables the user to contact the advertiser by phone without first having to identify the phone number, for example, from a webpage of the advertiser, or manually dial the phone number.

Another interactive functionality that can be associated with navigational element of the immersive content item 202 is an e-mail or chat functionality. The e-mail functionality initiates an e-mail to the advertiser in response to user interaction with navigational element. For example, if a user wants to request information from the advertiser and/or ask a question, the user can interact with the e-mail navigational element. The user interaction with the navigational element will launch an e-mail interface through which the user can send an e-mail to the advertiser. Similarly, the chat functionality can initiate a chat session with a customer service representative, thereby enabling the user to request specific information about the product or service from the customer service representative.

In some implementations, the interactive functionalities that are associated with the navigational elements 218, 220, and 222 can be selected dynamically (e.g., by the ICIA 120) based on the context in which the immersive content item 202 is presented. For example, the ICIA 120 can analyze prior instances in which the immersive content item 202 was presented to similarly situated users (e.g., users that performed similar user interactions and/or engaged in user sessions similar to the current user session) to identify which, if any, of the interactive functionalities were utilized by the similarly situated users. For example, the ICIA 120 may determine that at least some specified portion (or threshold portion) of the similarly situated users utilized the "product1 reviews" requery interactive functionality. In this example, the ICIA 120 may choose to associate the "product1 reviews" requery interactive functionality with one of the navigational elements. In some implementations, the ICIA 120 can rank the available interactive functionalities (e.g., based on prior utilization and/or other factors such as user feedback regarding interactive functionality usefulness) and associate a top N number of the interactive functionalities with the navigational elements that are included in the immersive content item 202 (where N is an integer corresponding to a number of navigational elements that are being included in the immersive content item 202).

Additional product information (i.e., beyond that provided in the first presentation interface) can also be included in the second navigational experience. For example, as illustrated by FIG. 3, the immersive content item 202 includes a set of product facts 302 that provide additional information about the product being advertised. The product facts 302 can be supplied by the advertiser and/or identified from various sources, such as the advertiser's website. The set of product facts 302 include three different facts 302*a*-302*c*.

The specific facts presented can be selected, for example, by the ICIA 120 based on information associated with the search query and/or information associated with a user of the search query. For example, assume that product1 is a specific car model, and that the user that submitted the search query previously submitted search queries regarding pricing of that specific car model and/or performance of the specific car model. In this example, the information regarding the previously submitted search queries can be used to identify pricing and/or performance information about the specific car model. For example, fact 1 302*a* may present pricing information for the specific car model, while fact 2 302*b* may present fuel economy information for the specific car model and fact 3 302*c* may present the horsepower of the specific car model.

In some implementations, the specific facts that are presented in the second presentation interface can be selected from a set of available facts (e.g., provided by the advertiser and/or obtained from a website of the advertiser). The selection of the set of available facts can be based on a ranking of the facts in view of the context in which the immersive content item 202 is being presented. For example, the ICIA 120 (or another data processing apparatus) can identify various combinations of attributes (e.g., geographic information, search history information, user profile information, time of day/day of week information, mobile device capabilities, or other attributes) that define the given context of previous user sessions, and determine the effectiveness of the various facts in the set of available facts when provided in each of the given contexts.

The effectiveness of the various facts can be determined, for example, based on user actions (e.g., product purchases, requests for additional information, click-throughs, or other actions) performed when each of the various facts was presented. The effectiveness of the various facts can also be determined, for example, based on express user feedback regarding the specific facts and their usefulness to the users (e.g., using surveys or other feedback mechanisms such as feedback icons+/− that can be presented next to the facts).

Once the effectiveness of the various facts has been determined, the facts can be ranked based on their effectiveness in each of the given contexts. When a content item request is subsequently received, the context in which the immersive content item 202 is being presented can be matched to one of the given contexts, and the ranking of the various facts for the matched given context can be used to select a highest ranked set of facts to be included in the second presentation interface of the immersive content item 202.

The second presentation interface includes an image portion 304 in which an image is presented. The image presented in the image portion 304 can be an image of the product or service that was identified based on the search query 204. In some implementations, the image portion 304 does not include the preview graphic 224 that was presented in the image portion 212 of the first presentation interface of FIG. 2. In some implementations, the image portion 304 includes an image sequencing indicator 306. The image sequencing indicator indicates that multiple images are available for viewing as well as a position of the currently presented image among the multiple images. For example, in FIG. 3 the image sequencing indicator 306 has a series of seven circles indicating that there are seven images available to be viewed in the immersive content item 202. A leftmost circle 308 of the image sequencing indicator 306 is shaded while the remaining six circles of the image sequencing indicator 306 are not shaded. The shading of the leftmost circle 308 indicates that there are six additional images that can be viewed, and that the user can view these images by scrolling to the right. The scrolling can be achieved, for example, by way of a right to left user swipe on the image portion 304. The scrolling can also be achieved, for example, through user interaction with scrolling mechanisms (e.g., an interactive user interface control that initiates image scrolling in response to user interaction with the interactive user interface control s). For purposes of example, the description that follows will refer to image scrolling that is achieved by way of user swipes, but the description is also applicable to implementations in which scrolling mechanisms or other user interface controls are used to scroll or otherwise navigate through a sequence of images.

Figure 4:
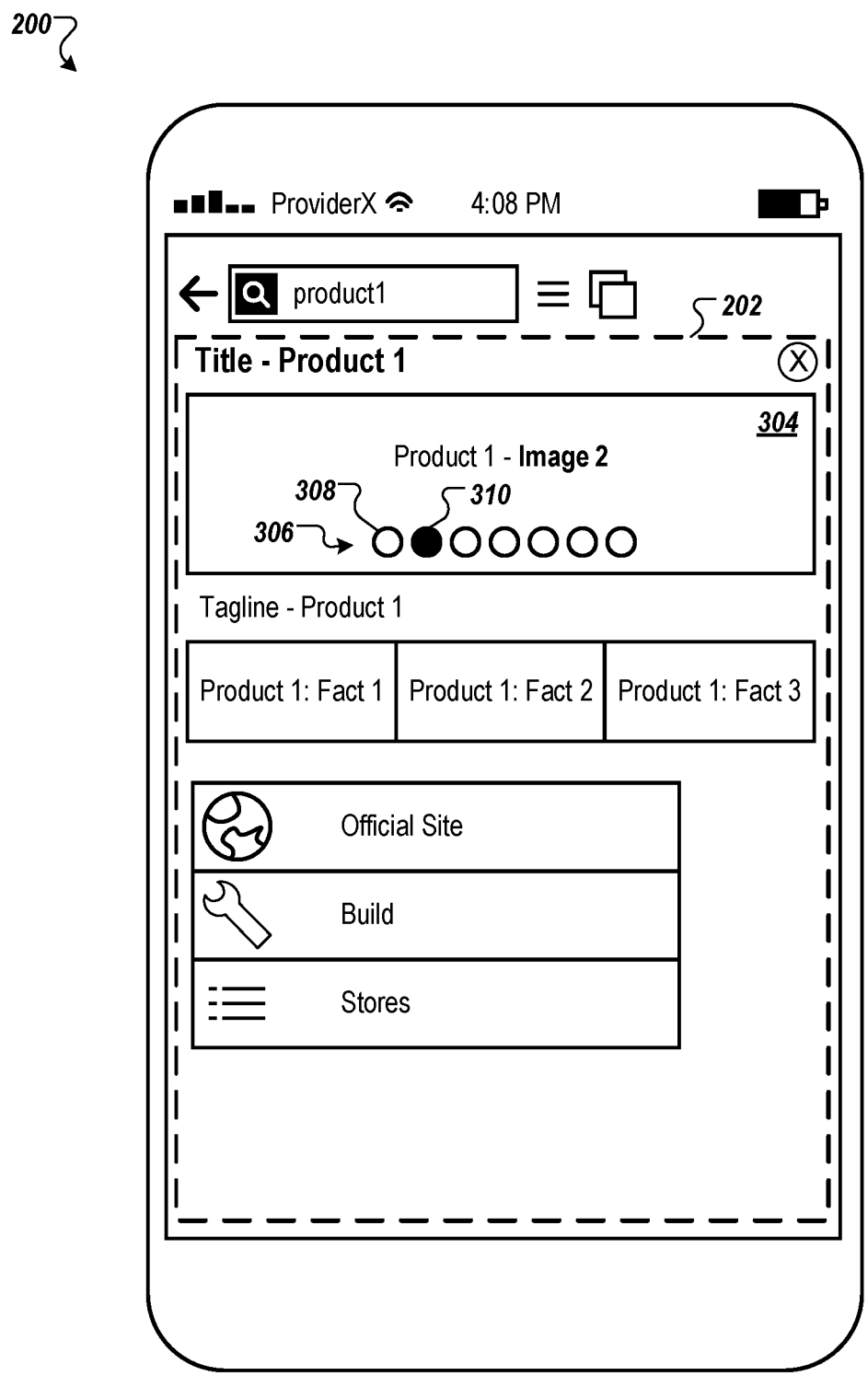
FIG. 4 is an illustration of a second presentation interface that is provided by the immersive content item subsequent to user interaction with the immersive content item.

FIG. 4 is another illustration of the second presentation interface that is provided by the immersive content item 202 subsequent to a right to left user swipe on the image portion 304. As illustrated by FIG. 4, the right to left user swipe causes a second image to be presented in the image portion 304 of the immersive content item 202. When the second image is presented in the image portion 304, the image sequencing indicator 306 is updated to signify that the second image in the series of seven images is currently being presented, that five more images can be presented through subsequent right to left user swipes, and one image can be presented through a left to right user swipe. In particular, subsequent to the right to left user swipe, the circle 310 is shaded rather than the leftmost circle 308, which is no longer shaded. In this example, the rest of the immersive content item 202 outside of the image portion 304 remains unchanged following the right to left user swipe. A user can continue to swipe left or right to view the various images that are available through the immersive content item 202.

Figure 5:
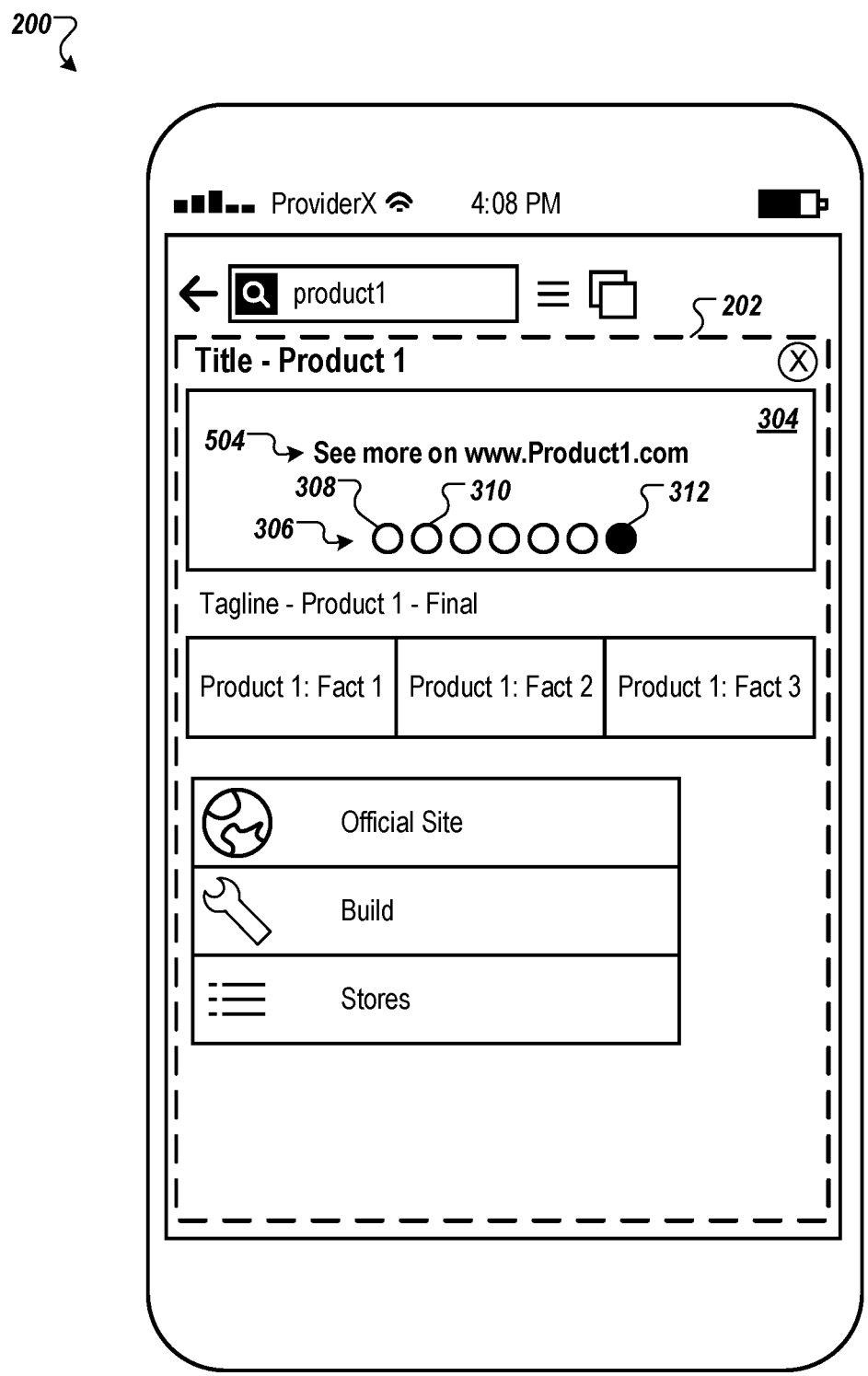
FIG. 5 is another illustration of the second presentation interface that is provided by the immersive content item.

FIG. 5 is another illustration of the second presentation interface that is provided by the immersive content item 202. As illustrated by FIG. 5, the rightmost circle 312 of the image sequencing indicator 306 is shaded, while the other circles of the image sequencing indicator 306 are not shaded. The shading of the image sequencing indicator 306 in FIG. 5 indicates that the user has reached a last image in the sequence of images.

When the last image in the sequence of images is presented (e.g., the user has swiped left to right until reaching a final image), code of the immersive content item 202 can cause the mobile device 200 to present descriptive text 504 informing the user of the availability of more product images at a specified webpage or website. For example, the text 504 recites "See more on product1.com," thereby informing the user that additional content (e.g., images, video, sounds, or other multimedia content) can be obtained from the specified webpage or website. In some implementations, code of the immersive content item 202 associates a link to the specified webpage or website with the last image in the sequence of images. For example, the code of the immersive content item 202 can specify that when a user interacts with (e.g., taps or clicks on) the last image in the sequence of images, the webpage or website corresponding to the link will be requested. In some implementations, each image in the sequence of images can be associated with the link to the specified webpage or website (e.g., linked to the webpage or website), such that a user tap or click on the image can initiate a request for the webpage or website corresponding to the link.

Code of the immersive content item 202 can also enable additional interactive functionality through additional types of interactions with the images (or other types of multimedia content) presented in the image portion 304. In some implementations, a user swipe from bottom to top (or top to bottom) on a displayed image can cause presentation of one or more images related to the displayed image. For example, assume that the displayed image shows an interior of a specific car model. In this example, if the user swipes from bottom to top on the image of the interior of the car, another image providing a more detailed view of the interior of the car can be presented in the image portion 304. Similarly, if the user swipes from top to bottom, a less detailed view of the interior of the car can be presented in the image portion 304.

Alternatively, or additionally, the user swipe from bottom to top on the image of the interior of the car can cause a new sequence of images to be loaded for presentation in the image portion 304. For example, again assuming that the user swipes from bottom to top on the image of the interior of the car, the user swipe can cause a new sequence of images that show various aspects of the interior of the car can be loaded for presentation in the image portion 304. In this example, the user can scroll through the images of the interior of the car, for example, by swiping from right to left or from left to right, as discussed above.

As discussed above, the user can end, or transition out of, the second presentation interface by, for example, tapping (or clicking) the end experience element 226. When the user interacts with the end experience element 226, the user can be transitioned from the second presentation interface to the first presentation interface. In some implementations, user interactions or other activity that occurred within the second presentation interface can be used to update content presented in the first presentation interface.

Figure 6A:
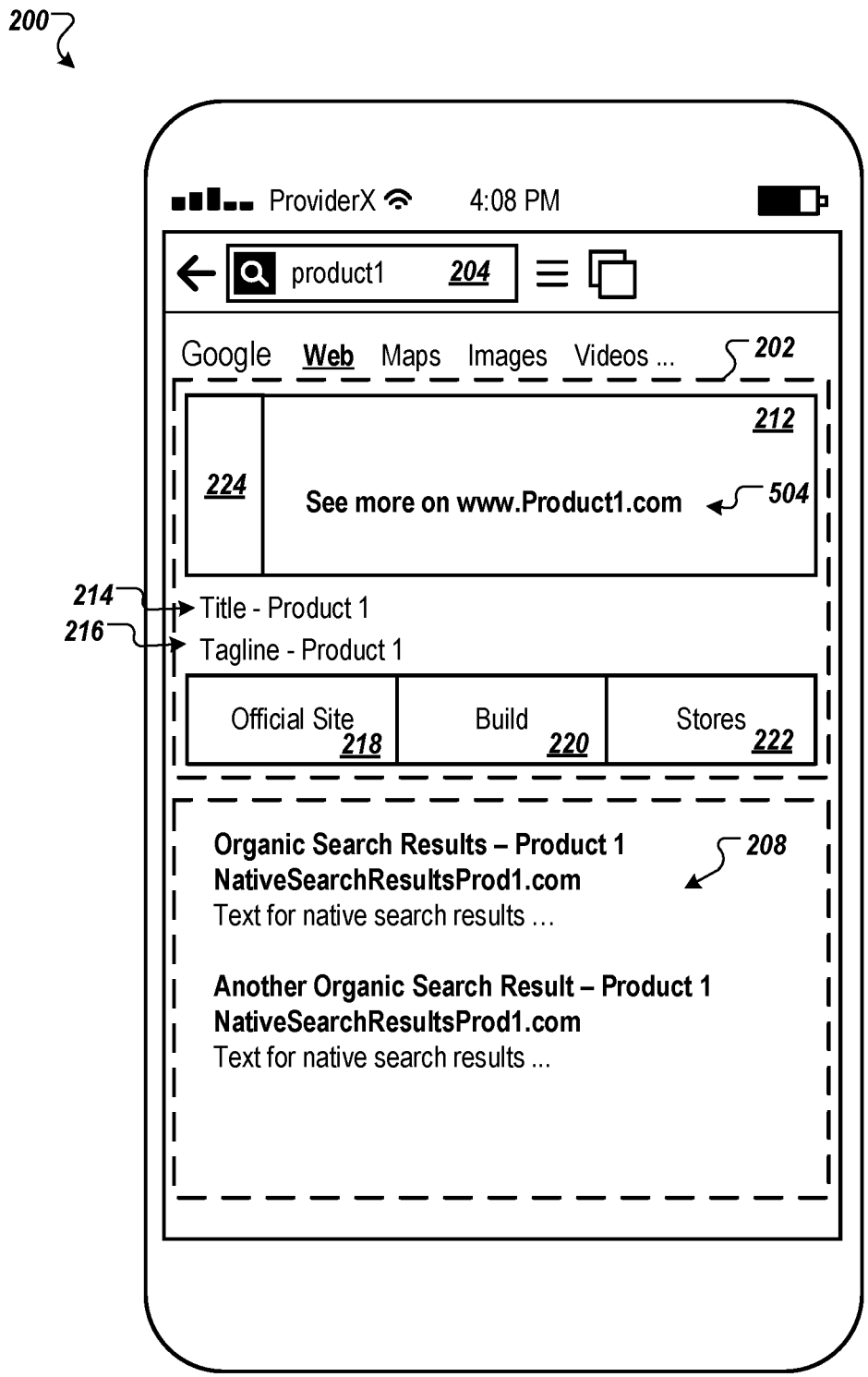
FIG. 6A is an illustration of the example first presentation interface that is provided subsequent to user interaction with the second presentation interface.

FIG. 6A is an illustration of the example first presentation interface that is provided subsequent to user interaction with the second presentation interface. Continuing with the example above, assume that the user interacted with the end experience element 226 while the last image in the sequence of images was presented in the image portion 304. In this example, the last image in the sequence of images is presented in the image portion 212 when the user is transitioned back to the first presentation interface, as illustrated by FIG. 6A. In this example, the image that is presented in the image portion 212 after user interaction with the second presentation interface is different than the image that was presented to the user when the user transitioned from the first presentation interface to the second presentation interface originally. As such, user interactions associated with the second presentation interface can be used to update the image presented to the user when the user transitioned back to the first presentation interface.

When the last image in the sequence of images is presented in the image portion 212, the last image can be presented with the descriptive text 504 that was presented in the second presentation interface. Similarly, code that the immersive content item 202 can initiate a request for the webpage or website where the referenced additional content can be obtained, in a manner similar to that described above. While reference is made to scrolling based on user interaction in either the first or the second presentation environments/interfaces, such scrolling can be automatic and not require user interaction.

The image portion 212 of the first presentation interface also enables a user to scroll through the set of available images (or other multimedia content). In some implementations, the image portion 212 does not include the image sequencing indicator 306 shown in FIGS. 5 and 6A. Rather, the image portion 212 can include a preview graphic 224 indicating that there are additional images available for viewing. For example, as shown in FIG. 6, the preview graphic 224 can be located on a right side of the image portion 212 indicating to the user that another image is available to be viewed by scrolling from left to right. The scrolling can be performed, for example, through a user swipe from left to right on the mobile device 200. The scrolling can also be performed, for example, through user interaction with a scrolling mechanism, as discussed above.

The user can scroll left to right or right to left through the sequence of images in a manner similar to that described above with reference to the second presentation interface. When additional images are available by scrolling either left to right or right to left (e.g., the user is not viewing the first image or last image in the sequence of images), in some implementations the image portion 212 can include two different preview graphics. For example, one preview graphic can be located on a left side of the image portion 212, while a second preview graphic can be presented on the right side of the image portion 212. When the user is viewing the first image in the sequence of images, the image portion 212 can include the preview graphic 224 on the right side of the image portion 212, as shown in FIG. 2. Other functionality discussed above with reference to images presented in the image portion 304 can also be provided for images presented in the image portion 212.

Figure 6B:
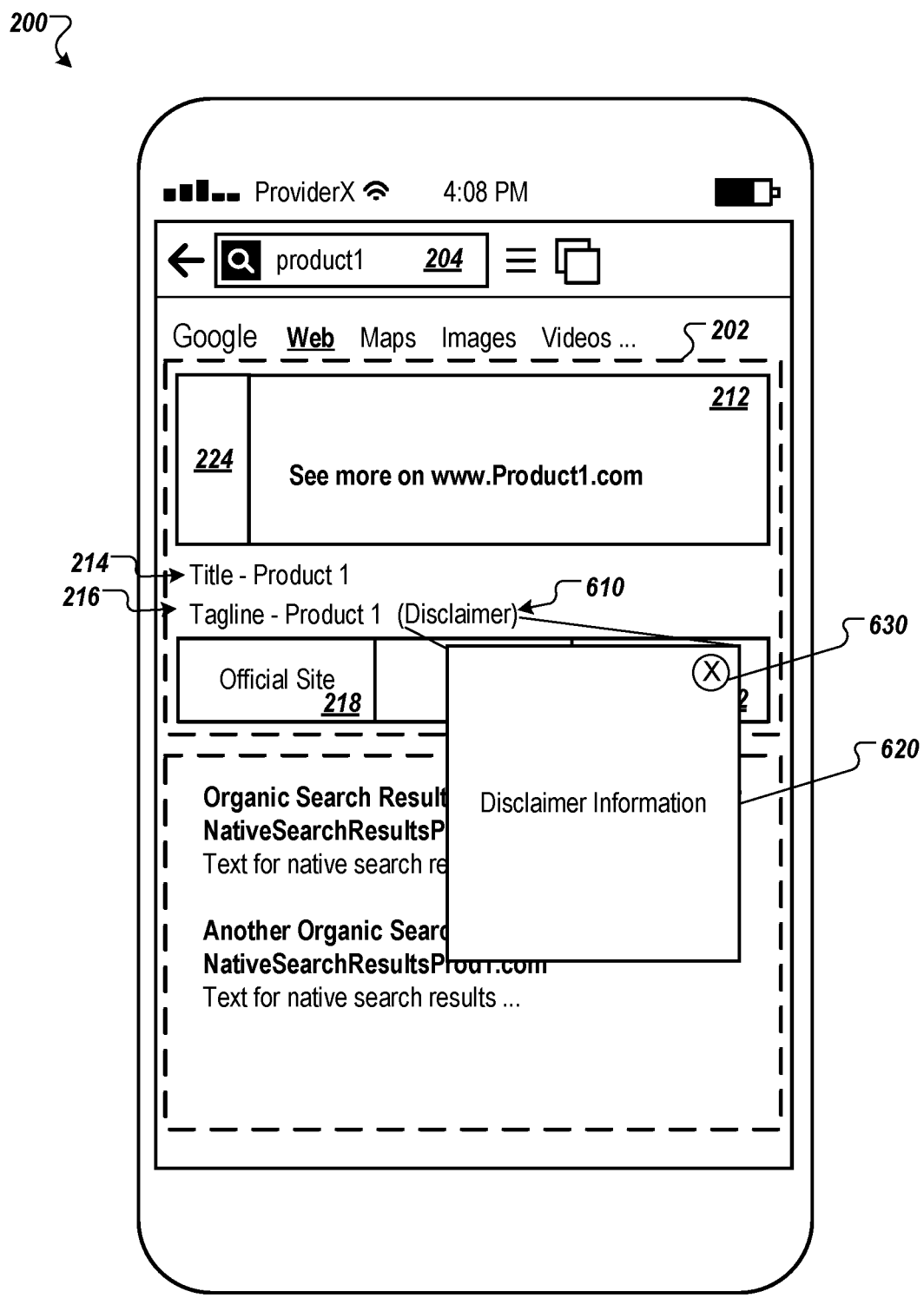
FIG. 6B is another illustration of the example first presentation interface that is provided subsequent to user interaction with the second presentation interface

FIG. 6B is another illustration of the example first presentation interface that is provided subsequent to user interaction with the second presentation interface. FIG. 6B shows an example of a disclaimer element (also referred to as a disclaimer interaction point) that can be included in the immersive content item 202. A disclaimer interaction point is associated with a tagline, an image, or another portion of the immersive content item, and provides additional information related to the tagline, the image or the other portion of the immersive content item. For example, if the tagline 216 specifies the fuel economy of a car, the tagline 216 can be associated with a disclaimer interaction element 610 that presents information regarding the source and/or disclaimers related to the fuel economy information provided in response to user interaction with the disclaimer interaction point. Thus, the disclaimer interaction element 610 can enable the user to quickly obtain additional disclaimer information related to claims about the product or service, without cluttering the immersive content item with the additional disclaimer information. In some implementations, the additional disclaimer information is presented in an overlay 620 that occludes part of the immersive content item. The overlay includes a user interface element 630 that enables the user to close the overlay so that the details of the disclaimer are no longer presented. A disclaimer element can be included in either the first presentation interface and/or the second presentation interface.

Figure 7:
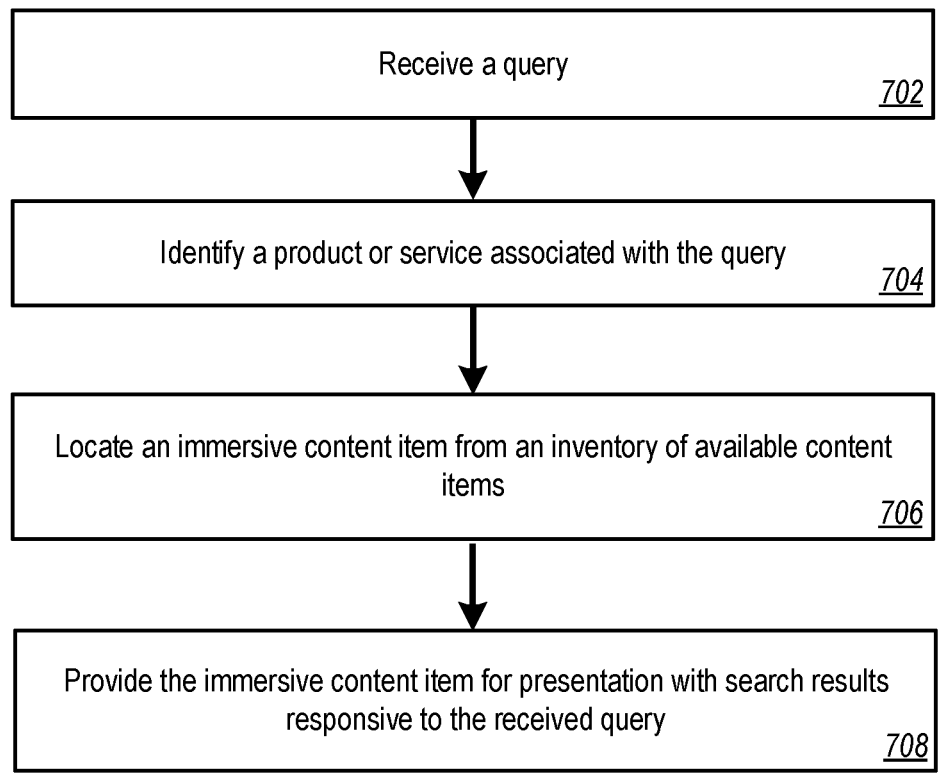
FIG. 7 is a flow chart of an example process for providing a multi-presentation interface in an immersive content item

FIG. 7 is a flow chart of an example process 700 for providing a multi-presentation interface in an immersive content item. The process 700 can be performed, for example, by one or more data processing apparatus, such as the ICIA 120 of FIG. 1. Operations of the process 700 can be implemented by instructions that when executed cause one or more data processing apparatus to perform operations of the process 700. The instructions can be stored on a non-transitory computer readable medium. In some implementations, the process 700 enables a mobile device to present content to users based, at least in part, on a location of the mobile device.

A query is received (702). In some implementations, the query can be a query that was submitted by a user through a search interface. For example, the query can include text and/or images that were submitted through a query entry field of a search application or an online search interface. The query can be submitted, for example, to a search system that identifies search results that are relevant to the submitted query. The query can be received by a data processing apparatus, such as the ICIA 120 of FIG. 1, for example, based on information provided to the data processing apparatus by one or more of the user device from which the query was submitted and/or the search system. In some implementations, the query is received as part of a content item request that is requesting one or more content items for presentation with the search results that are provided by the search system. The data processing apparatus can process the query to determine an additional content item to provide along with search results responsive to the query as described in more detail below.

A product or service associated with the query is identified (704). In some implementations, the product or service can be expressly identified by the query. For example, a query for "product1" may expressly refer to a given product that is named "product1." In some implementations, the product or service that is associated with the query may be inferred based on one or more terms in the query, geographic information associated with the query, information regarding query submission history associated with a user that submitted the query, or other information.

For example, users from different geographic regions may utilize various terms to refer to a given product or category of products. The terms used to refer to a given product by users in different geographic regions can be determined, for example, by analyzing query submissions and/or other activities of users from various geographic regions. For example, when users from two different geographic regions use two different terms to refer to a same product (e.g., as evidenced by click data indicating that users visited webpages related to the same product after submitting search queries including the two different terms), it may be determined that the two different terms refer to the same product. A similar evaluation of terms used by different segments of users can be performed, such that information about which segment of users is associated with a given query can be used to determine to which product or service the query referrers.

An immersive content item is located from an inventory of available content items (706). In some implementations, the located at immersive content item is a content item that is relevant to the identified product or service. For example, the located immersive content item can be a content item having a distribution keyword that is matched by the query.

The immersive content item includes a first presentation interface and a second presentation interface. The first presentation interface can include a title, an image presented in a scrollable image portion, a tagline, and multiple interaction points. The first presentation interface can also include a preview graphic that is presented with the image to indicate that other images are available for presentation within the immersive content item. In some implementations, the preview graphic is a portion (e.g., less than all or merely a hint) of the image that will be presented in response to a scroll interaction. The scroll interaction can be deemed to have occurred when a user swipes from left to right (or right to left) on the display of the user device, or when the user interacts with the scroll mechanism. An example first presentation interface is provided in FIG. 2.

The second presentation interface of the immersive content item is not visible upon initial presentation of the immersive content item. Rather, when a user device executes code of the immersive content item, the first presentation interface is initially presented in the display of the user device. After the first presentation interface is presented, the user device will initiate presentation of the second presentation interface in response to user interaction with a given interaction point of the immersive content item. For example, as discussed above, a user tap (or click) on the image of the first presentation interface can cause the user device to initiate presentation of the second presentation interface. In this example, the given interaction point is located within a display area of the image.

Interaction points are portions of the immersive content item to initiate interactive functionality in response to user interaction with the interaction points. For example, as discussed above, different elements of the immersive content item can be associated with different interactive functionality such user interaction with different portions of the immersive content item will initiate different actions. For instance, a user tap (or click) on the image presented in the first presentation interface can initiate presentation of the second presentation interface. Meanwhile, a user tap on a navigation element (e.g., similar to those presented in FIG. 2 and FIG. 3) can initiate either a request for a top page of the advertiser's website, a request for a specific lower page of the advertiser's website, or initiate a requery, as discussed above.

As discussed above, the requery can be initiated to obtain additional information about the product or service associated with the query. In some implementations, the terms of the requery request information about a supplier or source of the product or service associated with the query. For example, when the immersive content item is presented with search results responsive to the query "product1," the requery that is initiated through interaction with a requery interaction point can cause the user device to submit the query "product1 supplier" or a similar query to the search service. In this example, the search results that are received by the user device will replace any initial search results that were presented in the first presentation interface based on the search query "product1," and include information specifying a supplier, dealerships, or other entity through which the product or service can be purchased.

The second presentation interface also includes an image that is presented in a scrollable image portion, a title, a tagline, and multiple interaction points. In some implementations, layout of the second presentation interface differs from the layout of the first presentation interface. For example, as described above, the title of the second presentation interface can be located above the image, whereas the title of the first presentation interface may be located below the image. In some implementations, the tagline of the second presentation interface may be different than the tagline of the first presentation interface. Further, interaction points of the first presentation interface may be relocated for presentation in a different portion of the second presentation interface. For example, as discussed above with reference to FIGS. 2 and 3, the navigation elements 218, 220, and 222 can be configured in a horizontal configuration in the first presentation interface, and be configured in a vertical configuration in the second presentation interface.

As discussed above with reference to FIG. 3, the image presentation associated with the second presentation interface may differ from the image presentation associated with the first presentation interface. For example, the ability to view additional images in the first presentation interface may be indicated based on the inclusion of the preview graphic in an image portion of the first presentation interface. Meanwhile, the ability to view additional images in the second presentation interface may be indicated by the sequencing indicator similar to that presented in FIG. 3 (i.e., 306).

The initial image that is presented in the first presentation interface may be the first image in the sequence of ordered images that are available for presentation in the immersive content item. As discussed above, the user can scroll through the images in a variety of ways. When presentation of the second presentation interface is initiated (e.g., through user interaction with a presented image), the second presentation interface can initially be presented with either the first image in the sequence of ordered images or the image that was presented in the first presentation interface at the time that the presentation of the second presentation interface was initiated. In either case, the second presentation interface enables the user to scroll through the images in manner similar to that discussed above (e.g., using a control, such as a user swipe, that facilitates transitions between the sequence of images).

Each image in the sequence of images can be associated with the different tagline. Therefore, when a different image is presented in the immersive content item, a different tagline can be presented in the immersive content item. For example, when the second image in the sequence of images replaces the first image in the sequence of images, the tagline associated with the second image can replace the tagline associated with the first image.

Each of the first presentation interface and the second presentation interface can also include disclaimer interaction points. A disclaimer interaction point is associated with a tagline, an image, or another portion of the immersive content item, and provides additional information related to the tagline, the image or the other portion of the immersive content item. For example, if a tagline specifies the fuel economy of a car, the tagline can be associated with a disclaimer interaction point that presents information regarding the source and/or disclaimers related to the fuel economy information provided in response to user interaction with the disclaimer interaction point. Thus, the disclaimer interaction point can enable the user to quickly obtain additional disclaimer information related to claims about the product or service, without cluttering the immersive content item with the additional disclaimer information. In some implementations, the additional disclaimer information is presented in an overlay that occludes part of the immersive content item. The overlay can include a user interface element that enables the user to close the overlay so that it is no longer presented.

The immersive content item can also include descriptive text and/or a link to a resource that can provide additional multimedia content related to the product or service. For example, when a user reaches a last image in the sequence of images, the immersive content item can present the descriptive text informing the user of the resource from which additional multimedia content can be obtained. Additionally, in response to user interaction with the image, the immersive content item can initiate a request for the resource identified in the descriptive text to provide the user with additional information relating to the product or service. The immersive content item can also include descriptive text and/or a link to a resource that can provide other types of multimedia content. For example, a user may scroll through a series of sounds or videos that are included in the immersive content item. When the user scrolls to the last sound or video, the immersive content item can present the descriptive text. Additionally, in response to detecting user interaction with the last sound or video, the immersive content item can initiate a request for a resource from which additional sounds, images or videos related to the product or service can be obtained.

The second presentation interface can include a control for transitioning back to the first presentation interface. In response to detecting user interaction with the control for transitioning back to the first presentation interface (e.g., when the control is activated), the immersive content item can transition the display of the user device back to the first presentation interface. In some implementations, the image that was last presented in the second presentation interface is presented in the first presentation interface, such that activities performed in the second presentation interface change the content presented in the first presentation interface (e.g., relative to the content presented when the first presentation interface was last active).

The immersive content item is provided for presentation with search results responsive to the received query (708). In some implementations, the immersive content item is initially only partially provided. For example, a portion of the immersive content item required to present the first presentation interface can initially be provided in response to the query and/or a request for content based on the query. Providing only a portion of the immersive content item reduces the amount of data that initially needs to the transmitted to the user device. In these implementations, a remainder of the immersive content item can be provided to the user device in response to a determination that the user has requested presentation of the second presentation interface. For example, user interaction with the image presented in the first presentation interface can initiate a request for additional data that is required to present the second presentation interface. In response to the request, data used to render and/or reformat the immersive content item into the second presentation interface and/or one or more images can be transferred to the user device.

Alternatively, and/or additionally, the remainder of the immersive content item that is required to present the second presentation interface can be trickled to the user device after the initial portion of the immersive content item is provided to the user device. For example, a portion of the available bandwidth provided to the user device can be used to transmit the data required to present the second presentation interface to the user device over some specified period. Therefore, when presentation of the second presentation interface is requested, all of the data required to present the second presentation interface may have already been downloaded to the user device.

In some implementations, all the data used to present each of the first presentation interface and the second presentation interface is transferred to the user device in response to the query. For example, all images that will be available in each of the first presentation interface and the second presentation interface, as well as all factual information and report any information can be transferred to the user device in response to the query.

Figure 8:
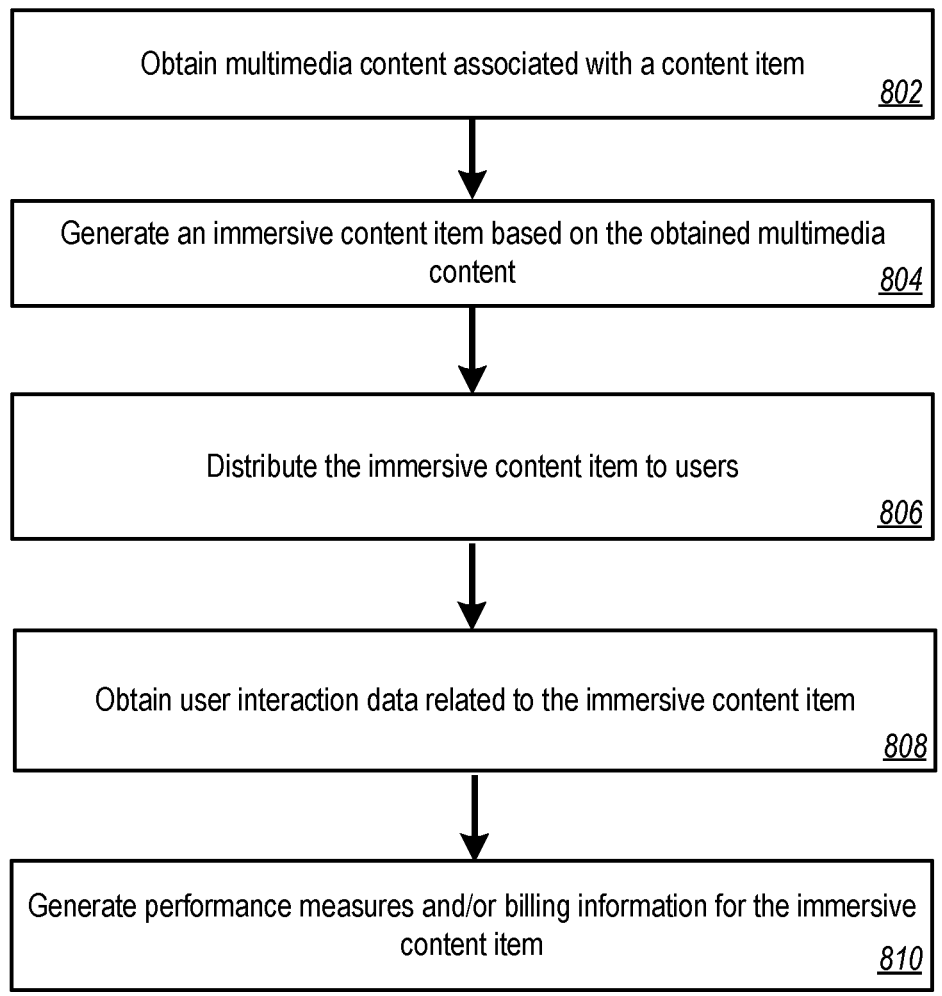
FIG. 8 is a flow chart of another example process for providing a multi-presentation interface in an immersive content item.

FIG. 8 is a flow chart of another example process 800 for providing a multi-presentation interface in an immersive content item. The process 800 can be performed, for example, by one or more data processing apparatus, such ICIA 120 of FIG. 1. Operations of the process 800 can be implemented by instructions that when executed cause one or more data processing apparatus to perform operations of the process 800. The instructions can be stored on a non-transitory computer readable medium. In some implementations, the process 800 enables a mobile device to present content to users based, at least in part, on a location of the mobile device.

Multimedia content associated with a content item is obtained (802). In some implementations, the multimedia content can include one or more of images, audio files, or video files. The multimedia content can be obtained, for example, by way of advertiser input. For example, an advertiser can access an advertisement management account and upload various multimedia files that can be associated with a content item. In some implementations, the multimedia content can be obtained from one or more network locations specified by an advertiser. For example, an advertiser can specify a domain associated with their website. This domain can be used to identify various webpages included in the domain, and extract content associated with one or more products from the various webpages.

An immersive content item is generated based on the obtained multimedia content (804). In some implementations, the immersive content item is generated to include one or more images, a title, a tagline, and multiple interaction points. The immersive content item can also be generated to include two different presentation interfaces. As described above, the immersive content item will include code that initially presents a first presentation interface, and transitions to a second presentation interface in response to user interaction with one of the interaction points. For example, a user interaction with (e.g., tap or click on) the presented image can transition the immersive content item from the first presentation interface to the second presentation interface. The immersive content item is generated to include code that rearranges at least a portion of the content included in the immersive content item during a transition between the two presentation interfaces. For example, as discussed above the immersive content item can change a location of the title and at least some of the interaction points (e.g., the navigation elements of FIGS. 2 and 3).

In some implementations, the immersive content item is generated to present additional factual information in the second presentation interface (e.g., relative to the information presented in the first presentation interface). For example, as discussed above with reference to FIG. 3, the immersive content item can present a set of factual information (e.g., 302) relevant to the product when the immersive content item is transitions to the second presentation interface. The method can further include retrieving such information in real time, rather than merely providing static data.

The immersive content item is distributed to users (806). In some implementations, the immersive content item is distributed to users that submitted a search query, and the immersive content item is distributed for presentation with search results responsive to the search query.

User interaction data related to the immersive content item is obtained (808). The user interaction data can specify user actions that occurred at a user device when the immersive content item is presented. For example, each interaction with the immersive content item (e.g., each swipe, each interaction with an interaction point, and/or each transition between the first presentation interface and the second presentation interface) can be logged in a client-side cookie (or another file) and uploaded to an interaction tracking server (e.g., the ICIA 120). The interaction tracking server can store the interactions in association with the immersive content item.

Performance measures and/or billing information are generated for the immersive content item (810). In some implementations, the performance measures and/or billing information can be generated based on the user interaction data. For example, the effectiveness of an immersive content item can be based, at least in part, on a number of user swipes that occurred during a given presentation of the immersive content item. Similarly, the effectiveness of the immersive content item can be based, at least in part, on whether a user transitions to the second presentation interface and/or how long the second presentation interface was presented at the user device. Further, the effectiveness of the immersive content item can be based, at least in part, on a number (or portion) of the interaction points with which users interacted during presentations of the immersive content item. The user interaction data can be aggregated over multiple different users and used to generate report informing the advertiser of the performance measures for the immersive content item. For example, the report can include information specifying an average number (or another measure of central tendency) of swipes per presentation of the immersive content item, an average number of images presented during each presentation of the immersive content item, and/or a portion of all immersive content item presentations that included a transition to the second presentation interface.

In some implementations, the generated report and/or the user interaction data can be used for billing purposes. For example, an amount charged for presentation of an immersive content item can be based on a level of interaction with the immersive content item. For example, a baseline bid can be used for purposes of billing when the immersive content item is presented to a user, but the user does not interact with any interaction points (e.g., the images, title, tagline, or navigation elements) of the immersive content item. In this example, advertisers can be required to pay more for each presentation of the immersive content item that resulted in a user interaction with one of the interaction points. Similarly, the amount paid by the advertiser can also vary based on the type of interaction occurred. For example, an advertiser can be required to pay some specified amount for each user swipe occurred (e.g., to view other images), another amount for a transition to the second presentation interface, and still some other amount for each interaction with a navigation element (or other interaction point).

Figure 9:
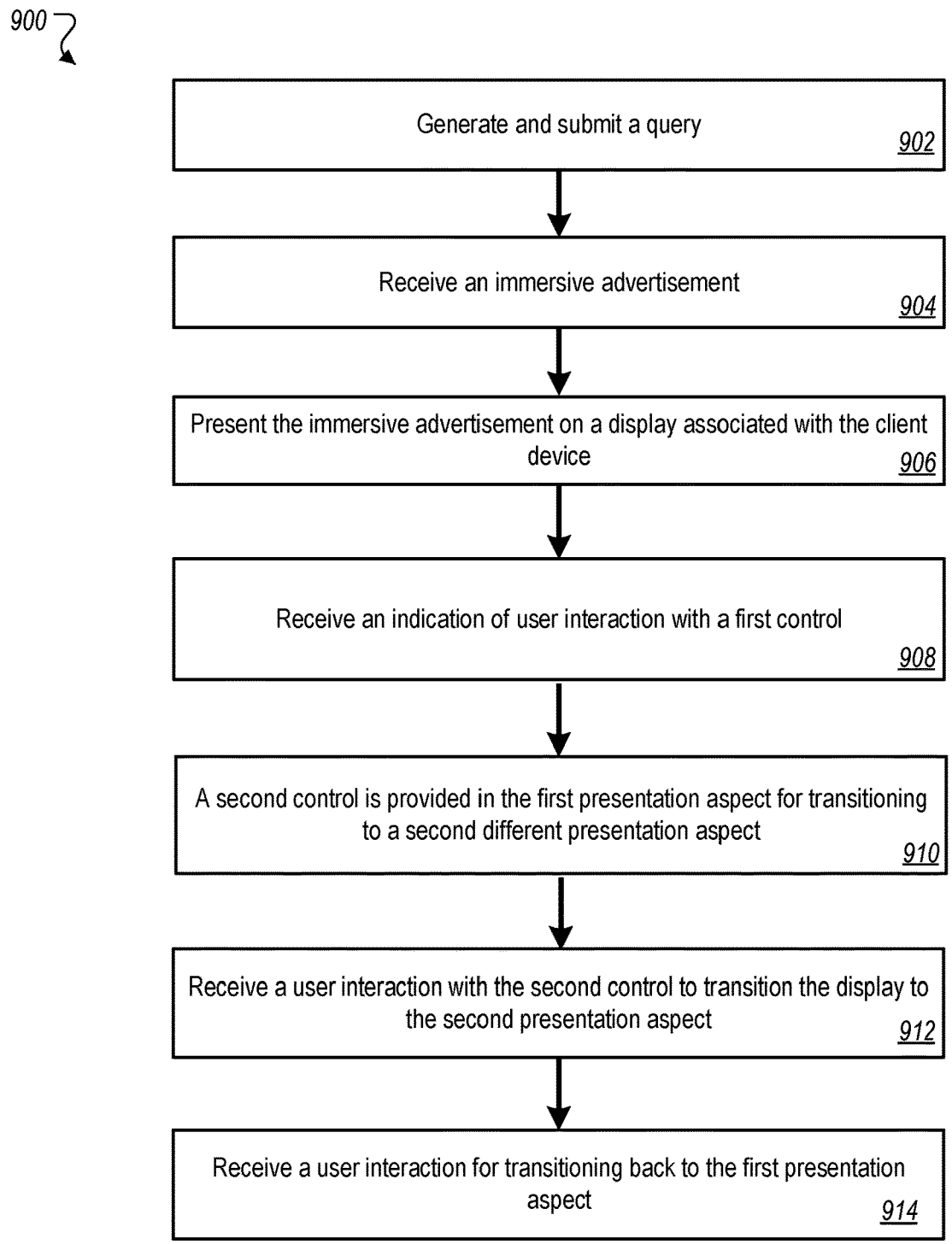
FIG. 9 is a flow chart of an example process 900 for presenting an immersive content item at a user device

FIG. 9 is a flow chart of an example process 900 for presenting an immersive content item at a user device, such as a mobile communications device. The process 900 begins with a query being generated and submitted from a client device (902). In some implementations, the query can be submitted to a search service.

An immersive advertisement is received in response to the query (904). In some implementations, the immersive advertisement can be a sponsored content item that is received for presentation with organic search results. For example, the immersive advertisement can be received from an advertisement server, while the organic search results can be received from a search service server that differs from the advertisement server.

The immersive advertisement is presented on a display associated with the client device (906). In some implementations, the presentation of the immersive advertisement includes presenting a first presentation aspect that includes an image portion. The image portion can include a first image and an image hint for a second image in a sequence of images that are associated with the immersive advertisement. The immersive advertisement can include a first control for transitioning to presentation, in the image portion, of a different image from the sequence. Similarly, a different portion of an image can be presented as the image hint in response to user interaction with the first control.

An indication of user interaction with the first control is received (908).

A second control is provided in the first presentation aspect for transitioning to a second different presentation aspect (910). The second different presentation aspect can include an image portion for presenting a then current image in the sequence and a sequence indicator for presenting an indication for where in the sequence the current image lies.

A user interaction with the second control is received (912). In some implementations, the user interaction with the second control causes a display of the immersive advertisement to be transitioned to the second presentation aspect.

A user interaction for transitioning back to the first presentation aspect is received (914). In response to the user interaction, a determination can be made as to the current image that is included in the image portion of the second different presentation aspect. In turn, the then current image can be presented in the image portion of the first presentation aspect.

Figure 10:
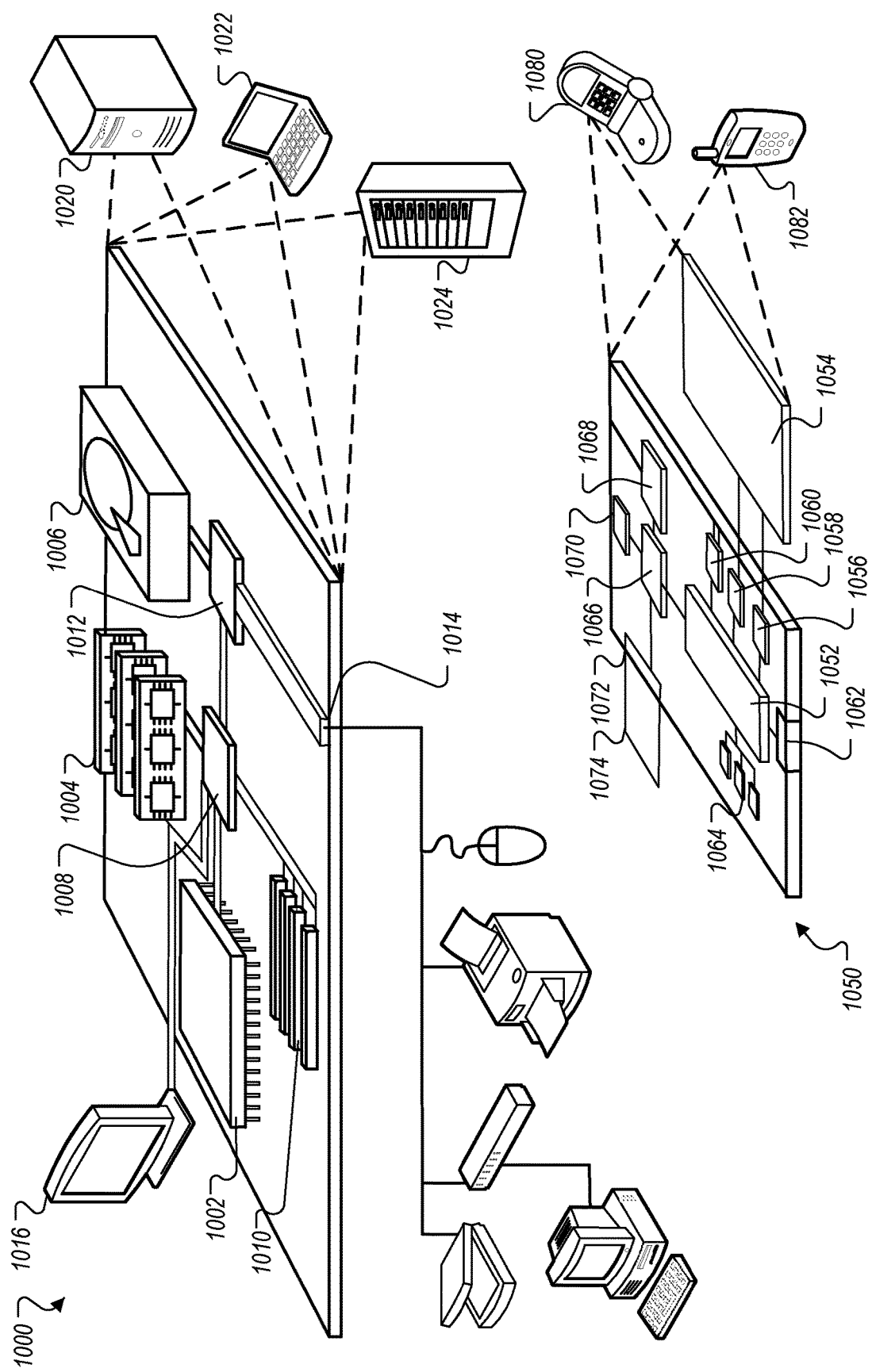
FIG. 10 is a block diagram of an example computer system.

FIG. 10 is a block diagram of example computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1000 is further intended to represent any other typically non-mobile devices, such as televisions or other electronic devices with one or more processers embedded therein or attached thereto. Computing device 1050 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 1000 includes a processor 1002, memory 1004, a storage device 1006, a high-speed controller 1008 connecting to memory 1004 and high-speed expansion ports 1010, and a low-speed controller 1012 connecting to low-speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high-speed controller 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In one implementation, the storage device 1006 is a computer-readable medium. In various different implementations, the storage device 1006 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low-speed controller 1012 manages lower bandwidth-intensive operations. Such allocation of duties is an example only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed bus 1014. The low-speed bus 1014 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as computing device 1050. Each of such devices may contain one or more of computing devices 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The computing device 1050 may also be provided with a storage device, such as a micro-drive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can process instructions for execution within the computing device 1050, including instructions stored in the memory 1064. The processor may also include separate analog and digital processors. The processor may provide, for example, for coordination of the other components of the computing device 1050, such as control of user interfaces, applications run by computing device 1050, and wireless communication by computing device 1050.

Processor 1052 may communicate with a user through control interface 1058 and display interface 1056 coupled to a display 1054. The display 1054 may be, for example, a TFT LCD display or an OLED display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of computing device 1050 with other devices. External interface 1062 may provide, for example, for wired communication (e.g., via a docking procedure) or for wireless communication (e.g., via Bluetooth® or other such technologies).

The memory 1064 stores information within the computing device 1050. In one implementation, the memory 1064 is a computer-readable medium. In one implementation, the memory 1064 is a volatile memory unit or units. In another implementation, the memory 1064 is a non-volatile memory unit or units. Expansion memory 1074 may also be provided and connected to computing device 1050 through expansion interface 1072, which may include, for example, a subscriber identification module (SIM) card interface. Such expansion memory 1074 may provide extra storage space for computing device 1050, or may also store applications or other information for computing device 1050. Specifically, expansion memory 1074 may include instructions to carry out or supplement the processes described above, and may include secure information also. Thus, for example, expansion memory 1074 may be provide as a security module for computing device 1050, and may be programmed with instructions that permit secure use of computing device 1050. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052.

Computing device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 1068 (e.g., a radio-frequency transceiver). In addition, short-range communication may occur, such as using a Bluetooth®, WiFi, or other such transceiver (not shown). In addition, GPS receiver module 1070 may provide additional wireless data to computing device 1050, which may be used as appropriate by applications running on computing device 1050.

Computing device 1050 may also communicate audibly using audio codec 1060, which may receive spoken information from a user and convert it to usable digital information. Audio codec 1060 may likewise generate audible sound for a user, such as through a speaker, e.g., in a handset of computing device 1050. Such sound may include sound from voice telephone calls, may include recorded sound (e.g., voice messages, music files, etc.) and may also include sound generated by applications operating on computing device 1050.

The computing device 1050 may be implemented in a number of different forms, as shown in the figure. For example, it may be implemented as a cellular telephone 1080. It may also be implemented as part of a smartphone 1082, personal digital assistant, or other mobile device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving a query;
   processing the query to determine an additional content item to provide in a search results page along with search results that are responsive to the query, wherein processing includes:
     identifying a product or service associated with the query;
     locating an immersive content item from an inventory of available content items that is relevant to the product or service, wherein the immersive content item includes:
       a first presentation interface that is presented when the search results page is loaded, and that includes:
         a title;
         an image;
         a first interaction point;
         a graphic indicating the availability of additional information for presentation;
         a line of text; and
         wherein:
           the immersive content item transitions from the first presentation interface to a second presentation interface that replaces the first presentation interface, while the search results page remains loaded, in response to interaction with the first interaction point, the second presentation interface including a scrollable image portion that presents a first image of a plurality of images and an image sequencing indicator, and repositioned text;
   providing the immersive content item for presentation along with search results responsive to the received query;
   transitioning the immersive content item from the first presentation interface to the second presentation interface in response to interaction with the first interaction point and while the search results page remains loaded;
   following user interaction with the second presentation interface, transitioning the immersive content item from the second presentation interface to a modified first presentation interface while the search results page remains loaded, including replacing the image of the first presentation interface with a different image that was presented in the second presentation interface when the transition occurred; and
   generating, upon interaction with at least one of the additional interaction points, a new search query related to the received search query and submitting the new search query to a search engine so as to enable new search results to be presented within the same search results page.

2. The method of claim 1 wherein the new search query is for a supplier or source of the product or service and wherein the search results include supplier, dealership or other entity for enabling purchasing the product or service.

3. The method of claim 1 wherein the scrollable image portion includes an initial image of the plural images for viewing in the scrollable image portion, wherein the plural images being in a sequence, wherein the scrollable image portion includes a first control for transitioning between the plural images in accordance with the sequence.

4. The method of claim 3 wherein the scrollable image portion includes a last image in the plural images, the last image including an interaction point and descriptive text for redirecting a user to a web resource with additional information relating to the product or service.

5. The method of claim 1 wherein providing the immersive content item includes providing instructions for loading the first and second presentation interfaces including images for the plurality of images.

6. The method of claim 1 wherein providing the immersive content item includes providing instructions for loading the first presentation interface at a time when the immersive content item is provided, and wherein upon receipt of an interaction with the first interaction point, the method further comprising providing instructions for rendering the second presentation interface including providing at least a first image of the plurality of images.

7. The method of claim 6 further comprising providing the plurality of images along with the instructions for rendering the second presentation interface.

8. A non-transitory computer storage medium encoded with a computer program, the program comprising instructions that when executed by one or more data processing apparatus cause the one or more data processing apparatus to perform operations comprising:
   receiving a query;
   processing the query to determine an additional content item to provide in a search results page along with search results that are responsive to the query, wherein processing includes:
     identifying a product or service associated with the query;
     locating an immersive content item from an inventory of available content items that is relevant to the product or service, wherein the immersive content item includes:
       a first presentation interface that is presented when the search results page is loaded, and that includes:
         a title;
         an image;
         a first interaction point;
         a graphic indicating the availability of additional information for presentation;
         a line of text; and
         wherein:
           the immersive content item transitions from the first presentation interface to a second presentation interface that replaces the first presentation interface, while the search results page remains loaded, in response to interaction with the first interaction point, the second presentation interface including a scrollable image portion that presents a first image of a plurality of images and an image sequencing indicator, and a repositioned text;

providing the immersive content item for presentation along with search results responsive to the received query;

transitioning the immersive content item from the first presentation interface to the second presentation interface in response to interaction with the first interaction point and while the search results page remains loaded;

following user interaction with the second presentation interface, transitioning the immersive content item from the second presentation interface to a modified first presentation interface while the search results page remains loaded, including replacing the image of the first presentation interface with a different image that was presented in the second presentation interface when the transition occurred; and generating, upon interaction with at least one of the additional interaction points, a new search query related to the received search query and submitting the new search query to a search engine so as to enable new search results to be presented within the same search results page.

9. The computer storage medium of claim 8 wherein the new search query is for a supplier or source of the product or service and wherein the search results include supplier, dealership or other entity for enabling purchasing the product or service.

10. The computer storage medium of claim 8 wherein the scrollable image portion includes an initial image of the plural images for viewing in the scrollable image portion, wherein the plural images being in a sequence, wherein the scrollable image portion includes a first control for transitioning between the plural images in accordance with the sequence.

11. The computer storage medium of claim 8 wherein the scrollable image portion includes a last image in the plural images, the last image including an interaction point and descriptive text for redirecting a user to a web resource with additional information relating to the product or service.

12. The computer storage medium of claim 8 wherein providing the immersive content item includes providing instructions for loading the first and second presentation interfaces including images for the plurality of images.

13. The computer storage medium of claim 8 wherein providing the immersive content item includes providing instructions for loading the first presentation interface at a time when the immersive content item is provided, and wherein upon receipt of an interaction with the first interaction point, the method further comprising providing instructions for rendering the second presentation interface including providing at least a first image of the plurality of images.

14. The computer storage medium of claim 13 further comprising providing the plurality of images along with the instructions for rendering the second presentation interface.

15. A system comprising:
a data store storing instructions; and
one or more data processing apparatus that interact with the data store and execute instructions that cause the one or more data processing apparatus to perform operations comprising:

receiving a query;

processing the query to determine an additional content item to provide in a search results page along with search results that are responsive to the query, wherein processing includes:

identifying a product or service associated with the query;

locating an immersive content item from an inventory of available content items that is relevant to the product or service, wherein the immersive content item includes:

a first presentation interface that is presented when the search results page is loaded, and that includes:

a title;

an image;

a first interaction point;

a graphic indicating the availability of additional information for presentation;

a line of text; and wherein:

the immersive content item transitions from the first presentation interface to a second presentation interface that replaces the first presentation interface, while the search results page remains loaded, in response to interaction with the first interaction point, the second presentation interface including a scrollable image portion that presents a first image of a plurality of images and an image sequencing indicator, and a repositioned text;

providing the immersive content item for presentation along with search results responsive to the received query;

transitioning the immersive content item from the first presentation interface to the second presentation interface in response to interaction with the first interaction point and while the search results page remains loaded;

following user interaction with the second presentation interface, transitioning the immersive content item from the second presentation interface to a modified first presentation interface while the search results page remains loaded, including replacing the image of the first presentation interface with a different image that was presented in the second presentation interface when the transition occurred; and generating, upon interaction with at least one of the additional interaction points, a new search query related to the received search query and submitting the new search query to a search engine so as to enable new search results to be presented within the same search results page.

* * * * *